US009978477B2

(12) United States Patent
Martin et al.

(10) Patent No.: US 9,978,477 B2
(45) Date of Patent: May 22, 2018

(54) DIELECTRIC FLUIDS

(71) Applicant: M & I MATERIALS LIMITED, Manchester (GB)

(72) Inventors: Russell Martin, Manchester (GB); Francine Elizabeth Edwards, Manchester (GB)

(73) Assignee: M & I Materials Limited, Manchester (GB)

(*) Notice: Subject to any disclaimer, the term of this patent is extended or adjusted under 35 U.S.C. 154(b) by 457 days.

(21) Appl. No.: 14/621,855

(22) Filed: Feb. 13, 2015

(65) Prior Publication Data

US 2015/0228373 A1 Aug. 13, 2015

(30) Foreign Application Priority Data

Feb. 13, 2014 (GB) ................................... 1402570.4

(51) Int. Cl.

*C09K 5/00* (2006.01)
*H01B 3/20* (2006.01)
*C10M 105/00* (2006.01)

(52) U.S. Cl.

CPC ............ *H01B 3/20* (2013.01); *C10M 105/00* (2013.01); *C10M 2207/281* (2013.01); *C10N 2240/201* (2013.01)

(58) Field of Classification Search

None

See application file for complete search history.

(56) References Cited

U.S. PATENT DOCUMENTS

| | | | | |
|---|---|---|---|---|
| 4,826,633 | A | 5/1989 | Carr et al. | |
| 6,177,387 | B1 | 1/2001 | Schlosberg et al. | |
| 2008/0033201 | A1 | 2/2008 | Hoff et al. | |
| 2009/0270644 | A1 | 10/2009 | Kano et al. | |
| 2010/0117022 | A1* | 5/2010 | Carr .................... | C10M 105/44 252/68 |
| 2012/0283162 | A1 | 11/2012 | Tsubouchi | |
| 2013/0035268 | A1 | 2/2013 | Zehler | |

FOREIGN PATENT DOCUMENTS

| | | | |
|---|---|---|---|
| JP | 2004-273291 | A | 9/2004 |
| JP | 2005-232470 | A | 9/2005 |
| JP | 2005-276714 | A | 10/2005 |
| WO | WO 2006/074553 | A1 | 7/2006 |

OTHER PUBLICATIONS

Search Report performed within the UKIPO for Application No. GB1402570.4 in the name of M & I Materials limited. Search completed Jan. 16, 2015.

Search Report performed within the UKIPO for Application No. GB1502478.9. Search completed Nov. 26, 2015.

European Search Report for EP Application No. 15 15 5123. Search completed Jun. 10, 2015.

* cited by examiner

*Primary Examiner* — Necholus Ogden, Jr.

(74) *Attorney, Agent, or Firm* — Leydig, Voit & Mayer, LLP

(57) ABSTRACT

The present invention relates to dielectric fluids and esters, particularly to ester compositions suitable for use in dielectric fluid compositions as well as to dielectric fluid compositions, methods of manufacturing ester compositions and dielectric fluid compositions, and to electrical apparatus containing the dielectric fluids.

17 Claims, No Drawings

DIELECTRIC FLUIDS

CROSS-REFERENCE TO RELATED APPLICATIONS

This patent application claims priority to GB Application No. 1402570.4, filed on Feb. 13, 2014 which is hereby incorporated by reference.

FIELD OF INVENTION

The present invention relates to dielectric fluids and esters, particularly, though not exclusively, to ester compositions suitable for use in dielectric fluid compositions as well as to dielectric fluid compositions, methods of manufacturing ester compositions and dielectric fluid compositions and to electrical apparatus.

BACKGROUND TO INVENTION

The use of dielectric fluids in electrical apparatus such as transformers is well known. Dielectric fluids known for such use include mineral oil based fluids, natural ester based fluids and synthetic ester based fluids. Known synthetic esters include those produced from the reaction of an alcohol with carboxylic acids. Dielectric fluids based on such synthetic esters have a number of advantages over mineral oil based fluids but there remains a need for synthetic esters having improved properties, particularly in relation to the pour point, flash point and fire point properties.

Accordingly, the present invention aims to address at least one problem associated withknown dielectric fluids, whether discussed herein or otherwise, and/or to provide dielectric fluids having improved properties.

SUMMARY OF INVENTION

According to a first aspect of the present invention there is provided an ester composition, wherein the ester composition comprises esters of: (a) one or more alcohols; and (b) three or more $C_4$ to $C_{12}$ carboxylic acids wherein at least one of said acids is selected from the group consisting of:

(i) a branched $C_8$ to $C_{12}$ acid wherein said acid comprises a backbone having no branching at the C2 position;

(ii) a branched $C_4$ to $C_7$ acid; and (iii) a branched $C_9$ to $C_{12}$ acid wherein said acid comprises a backbone having branching at the C3 position.

Suitably, there is provided an ester composition, wherein the ester composition comprises esters of:

(a) one or more alcohols; and (b) three or more $C_4$ to $C_{12}$ carboxylic acids wherein at least one of said acids is selected from the group consisting of:

(i) a branched $C_8$ to $C_{12}$ acid wherein said acid has the formula R1-$CH_2$—COOH wherein R1 represents a branched $C_6$ to $C_{10}$ alkyl radical;

(ii) a branched $C_4$ to $C_7$ acid wherein said acid has the formula R2-COOH wherein R2 represents a $C_3$ to $C_6$ alkyl radical; and (iii) a branched $C_9$ to $C_{12}$ acid wherein said acid has the formula R3-C(R4)(R5) COOH wherein R3 represents an alkyl radical, R4 represents and alkyl radical and R5 represents an alkyl radical or hydrogen.

Suitably, the ester composition has dielectric properties. Suitably, the ester composition is suitable for use as a dielectric fluid. Suitably, the ester composition is suitable for use as a dielectric fluid without the need to be combined with a pour point depressant.

Suitably, the or each alcohol (a) is a polyol. The alcohol (a) suitably consists of a polyol. The alcohol (a) suitably comprises a $C_4$ to $C_{10}$ alcohol. The alcohol (a) suitably comprises a $C_4$ to $C_{10}$ polyol. The alcohol (a) suitably comprises $C_3$, $C_4$, $C_5$, $C_6$ and/or $C_{10}$ alcohol.

Suitably, the alcohol (a) comprises a $C_4$ to $C_6$ alcohol.

Suitably, there is provided an ester composition, wherein the ester composition comprises esters of:

(a) one or more polyols; and (b) three or more $C_4$ to $C_{12}$ carboxylic acids wherein at least one of said acids is selected from the group consisting of:

(i) a branched $C_8$ to $C_{12}$ acid wherein said acid comprises a backbone having no branching at the C2 position; and (ii) a branched $C_4$ to $C_7$ acid.

Suitably, one of the, or each, alcohol comprises a $C_5$ alcohol. Suitably, the composition comprises esters of a single alcohol (a). Suitably, the alcohol (a) comprises a $C_5$ alcohol. Suitably, the alcohol (a) consists of a $C_5$ alcohol.

Suitably, the alcohol (a) comprises pentaerythritol. Suitably, the alcohol (a) consists of pentaerythritol. The alcohol may comprise di-pentaerythritol.

Suitably, the ester composition comprises a tetraester. Suitably, the ester composition comprises a pentaerythritol tetraester. The ester composition may comprise a mono ester, diester and/or triester.

Suitably the ester composition comprises more than one different tetraester. Suitably the ester composition comprises more than two different tetraesters, for example more than four different tetraesters.

Suitably, the ester composition comprises esters formed from the reaction of carboxylic acids with an alcohol having two or more hydroxyl groups. Suitably, the ester composition comprises esters formed from the reaction of carboxylic acids with an alcohol having three or more hydroxyl groups. Suitably, the ester composition comprises esters formed from the reaction of carboxylic acids with an alcohol having four hydroxyl groups, for example pentaerythritol.

Suitably, the ester composition comprises a mixed ester.

Suitably, as used herein, the term “mixed ester” includes: (i) an ester in which the constituent acids in an ester molecule comprise three or more acids.

Suitably, the ester composition comprises a mixed ester composition.

Suitably, as used herein, the term “mixed ester composition” includes: (i) a mixed ester (as defined above); (ii) an ester composition comprising three or more different esters; and (iii) a combination of (i) and (ii).

Suitably, the ester composition comprises a mixed ester in which the constituent acids in an ester molecule comprise three or more acids. Suitably, the ester composition comprises a mixed ester in which the constituent acids in an ester molecule comprise four acids.

Suitably the ester composition comprises three or more different mixed esters. Suitably, the ester composition comprises three or more different mixed esters, suitably the ester composition comprises four or more different mixed esters.

The ester composition suitably comprises five or more different esters. The ester composition suitably comprises ten or more different esters. The ester composition suitably comprises fifteen or more different esters. The ester composition suitably comprises twenty or more different esters.

The ester composition suitably comprises twenty five or more different esters. The ester composition suitably comprises thirty or more different esters. The ester composition suitably comprises thirty five different esters.

Suitably, the ester composition comprises esters formed from the reaction of an alcohol with three or more saturated fatty acids.

Suitably, the ester composition comprises esters formed from the reaction of an alcohol with three or more carboxylic acids wherein at least one of said carboxylic acids is a linear chain acid.

Suitably, the ester composition comprises esters formed from the reaction of an alcohol with three or more carboxylic acids wherein one of said carboxylic acids is a branched carboxylic acid and the other of said carboxylic acids is/are linear chain carboxylic acids.

Suitably, the ester composition comprises esters formed from the reaction of an alcohol with a mixture of four or more carboxylic acids (b). Suitably, the ester composition comprises esters formed from the reaction of an alcohol with a mixture of four carboxylic acids (b).

Suitably, the ester composition comprises esters formed from the reaction of an alcohol with a $C_4$-$C_{12}$ acid having no branching at the C2 position. Suitably, the ester composition comprises esters formed from the reaction of an alcohol with a $C_4$, $C_5$, $C_6$, $C_7$, $C_8$, $C_9$, $C_{10}$, $C_{11}$ or $C_{12}$ acid having no branching at the C2 position.

Suitably, the ester composition comprises esters formed from the reaction of an alcohol with three or more carboxylic acids each selected from the group consisting of $C_7$-$C_{12}$ carboxylic acids. Suitably, the ester composition comprises esters formed from the reaction of an alcohol with three or more carboxylic acids each selected from the group consisting of $C_7$-$C_{10}$ carboxylic acids.

Suitably, the ester composition comprises esters formed from the reaction of an alcohol with a branched $C_8$ to $C_{12}$ carboxylic acid having one or more $C_1$ side groups.

Suitably, the ester composition comprises esters formed from the reaction of an alcohol with a branched $C_8$ to $C_{12}$ carboxylic acid having one or more $C_2$ side groups.

Suitably, the ester composition comprises esters formed from the reaction of an alcohol with a branched $C_8$ to $C_{12}$ carboxylic acid wherein said acid comprises a backbone having branching at the C3 position.

Suitably, the ester composition comprises esters formed from the reaction of an alcohol with a branched $C_8$ to $C_{12}$ carboxylic acid wherein said acid comprises a backbone having branching at the C5 position.

Suitably, the ester composition comprises esters formed from the reaction of an alcohol with a branched $C_8$ to $C_{12}$ carboxylic acid having a $C_6$ backbone.

The ester composition may comprise esters formed from the reaction of an alcohol with a branched $C_9$ to $C_{12}$ carboxylic acid having a $C_6$ to $C_8$ backbone.

Suitably, the ester composition comprises esters formed from the reaction of an alcohol with a branched $C_8$ to $C_{12}$ carboxylic acid having a $C_6$ backbone and one or more $C_1$ side groups.

Suitably, the ester composition comprises esters formed from the reaction of an alcohol with a branched $C_8$ to $C_{12}$ carboxylic acid having a $C_6$ backbone and $C_1$ side groups at the C3 and/or C5 positions of the backbone.

Suitably, the ester composition comprises esters formed from the reaction of an alcohol with a branched $C_9$ carboxylic acid.

Suitably, the ester composition comprises esters formed from the reaction of an alcohol with isononanoic acid.

Suitably, the ester composition comprises esters formed from the reaction of an alcohol with 3,5,5-trimethylhexanoic acid.

Suitably, the ester composition comprises esters formed from the reaction of an alcohol with a linear $C_7$ carboxylic acid.

Suitably, the ester composition comprises esters formed from the reaction of an alcohol with a linear $C_8$ carboxylic acid.

Suitably, the ester composition comprises esters formed from the reaction of an alcohol with a branched $C_9$ carboxylic acid.

The ester composition may comprise esters formed from the reaction of an alcohol with a linear $C_9$ carboxylic acid.

Suitably, the ester composition comprises esters formed from the reaction of an alcohol with a linear $C_{10}$ carboxylic acid.

Suitably, the ester composition comprises esters formed from the reaction of an alcohol with: a linear $C_7$ carboxylic acid;

a linear $C_8$ carboxylic acid;

a branched $C_9$ carboxylic acid; and a linear $C_{10}$ carboxylic acid.

Suitably, the ester composition comprises esters formed from the reaction of carboxylic acids with a $C_4$ to $C_{10}$ alcohol. Suitably, the ester composition comprises esters formed from the reaction of carboxylic acids with a $C_4$, $C_5$, $C_6$ or $C_{10}$ alcohol.

Suitably, the ester composition comprises esters formed from the reaction of carboxylic acids with a single alcohol (a) selected from the group consisting of $C_4$ to $C_{10}$ alcohols.

Suitably, the ester composition consists of esters formed from the reaction of carboxylic acids with a single alcohol (a) selected from the group consisting of $C_4$ to $C_{10}$ alcohols.

Suitably, the ester composition comprises esters formed from the reaction of carboxylic acids with a $C_5$ alcohol.

Suitably, the ester composition comprises esters of:

(a) a $C_5$ alcohol; and (b) four $C_4$ to $C_{12}$ carboxylic acids wherein at least one of said acids is selected from the group consisting of:

(i) a branched $C_8$ to $C_{12}$ acid wherein said acid comprises a backbone having no branching at the C2 position;

(ii) a branched $C_4$ to $C_7$ acid; and (iii) a branched $C_9$ to $C_{12}$ acid wherein said acid comprises a backbone having branching at the C3 position.

Suitably, the ester composition comprises esters of:

(a) a $C_5$ alcohol; and (b) four $C_7$ to $C_{10}$ carboxylic acids wherein at least one of said acids is selected from the group consisting of:

(i) a branched $C_8$ to $C_{10}$ acid wherein said acid comprises a backbone having no branching at the C2 position.

Suitably, the ester composition consists of esters of:

(a) a $C_5$ alcohol; and (b) four $C_7$ to $C_{10}$ carboxylic acids wherein at least one of said acids is selected from the group consisting of:

(i) a branched $C_8$ to $C_{10}$ acid wherein said acid comprises a backbone having no branching at the C2 position.

Suitably, the ester composition comprises esters formed from the reaction of a $C_5$ alcohol with an acid mixture comprising:

an unbranched $C_7$ carboxylic acid;

an unbranched $C_8$ carboxylic acid;

a branched $C_9$ carboxylic acid; and an unbranched $C_{10}$ carboxylic acid.

Suitably, the ester composition consists of esters formed from the reaction of a $C_5$ alcohol with an acid mixture consisting of:

an unbranched $C_7$ carboxylic acid;

an unbranched $C_8$ carboxylic acid;

a branched $C_9$ carboxylic acid; and an unbranched $C_{10}$ carboxylic acid.

Suitably, the ester composition comprises esters of:

(a) pentaerythritol; and (b) heptanoic acid, n-octanoic acid, 3,5,5-trimethylhexanoic acid and n-decanoic acid.

Suitably, the ester composition consists of esters of:

(a) pentaerythritol; and (b) heptanoic acid, n-octanoic acid, 3,5,5-trimethylhexanoic acid and n-decanoic acid.

Suitably, there is provided an ester composition, wherein the ester composition comprises esters of:

(a) pentaerythritol; and (b) heptanoic acid, octanoic acid, isononanoic acid and decanoic acid;

wherein the ester composition is prepared by reacting pentaerythritol with a mixture of said acids.

Suitably, there is provided an ester composition, wherein the ester composition consists of esters of:

(a) pentaerythritol; and (b) heptanoic acid, octanoic acid, isononanoic acid and decanoic acid;

wherein the ester composition is prepared by reacting pentaerythritol with a mixture of said acids.

Suitably, according to the present invention there is provided an ester composition, wherein the ester composition comprises esters of:

(a) pentaerythritol; and (b) heptanoic acid, n-octanoic acid, 3,5,5-trimethylhexanoic acid and n-decanoic acid; and wherein the ester composition is prepared by reacting pentaerythritol with an acid mixture and wherein said acid mixture comprises said acids in the following molar percentages of said acid mixture:

40-70% heptanoic acid;

10-35% of a mixture of n-octanoic and n-decanoic acids; and 10-35% 3,5,5-trimethylhexanoic acid.

Suitably, said acid mixture comprises said acids in the following molar percentages of said acid mixture:

40-70% heptanoic acid;

10-35% of a mixture of n-octanoic and n-decanoic acids; and 10-30% 3,5,5-trimethylhexanoic acid.

Suitably, said acid mixture comprises said acids in the following molar percentages of said acid mixture:

50-70% heptanoic acid;

10-30% of a mixture of n-octanoic and n-decanoic acids; and 10-30% 3,5,5-trimethylhexanoic acid.

Suitably, said acid mixture comprises said acids in the following molar percentages of said acid mixture:

60-70% heptanoic acid;

12-20% of a mixture of n-octanoic and n-decanoic acids; and 15-25% 3,5,5-trimethylhexanoic acid.

Suitably, said acid mixture comprises said acids in the following molar percentages of said acid mixture:

62-68% heptanoic acid;

13-18% of a mixture of n-octanoic and n-decanoic acids; and 17-23% 3,5,5-trimethylhexanoic acid.

Suitably, the ester composition is prepared by reacting pentaerythritol with an acid mixture and wherein said acid mixture comprises said acids in the following molar percentages of said acid mixture:

65% heptanoic acid;

15% of a mixture of n-octanoic and n-decanoic acids; and

20% 3,5,5-trimethylhexanoic acid.

Surprisingly it has been found that an ester prepared from a mixture of carboxylic acids with selected relative ratios may have properties advantageous for use as a dielectric fluid, such as for example a dynamic viscosity of less than 30 cP at 40° C., for example less than 28 cP at 40° C.

Suitably, the ester composition is substantially free from esters formed from the reaction of an alcohol with acids having branching in the C2-position.

Suitably, the ester composition comprises pentaerythritol, triheptanoate, 3,5,5-trimethylhexanoate ester in an amount of between 10 and 30% by weight, for example in an amount of between 16 and 23% by weight.

Suitably, the ester composition comprises pentaerythritol tetraheptanoate ester in an amount of between 5 and 25% by weight, for example in an amount of between 11 and 20% by weight.

Suitably, the ester composition comprises pentaerythritol, diheptanoate, di-3,5,5-trimethylhexanoate ester in an amount of between 5 and 15% by weight, for example in an amount of between 8 and 11% by weight.

Suitably, the ester composition comprises mixed minor tetraesters of $C_7$, $C_8$, $C_9$, $C_{10}$ acids with pentaerythritol in an amount of between 40 and 70% by weight, for example in an amount of between 47 and 65% by weight and suitably wherein no individual one of said tetraesters is present in an amount above 10% by weight of the total.

Suitably, the ester composition comprises minor components of mono, di and tri esters of $C_7$, $C_8$, $C_9$, $C_{10}$ acids with pentaerythritol and also pentaerythritol and $C_7$, $C_8$, $C_9$, $C_{10}$ acids in a combined amount of less than 3% by weight.

Suitably, the ester composition is substantially free from carboxylic acids. Suitably, the ester composition is substantially free from pentaerythritol. Suitably, the ester composition comprises minor components of mono, di and tri esters of $C_7$, $C_8$, $C_9$, $C_{10}$ acids with pentaerythritol in an amount of less than 3% by weight.

The ester composition may comprise alcohol and/or acids as impurities. Suitably, the ester composition is substantially free of alcohol and/or acids.

Suitably, the ester composition has a viscosity of 35 cP or less at 40° C. Suitably, the ester composition has a viscosity of 30 cP or less at 40° C. Suitably, the ester composition has a viscosity of 29 cP or less at 40° C., for example 28 cP or less or 27 cP or less at 40° C. Suitably, said viscosity comprises dynamic viscosity.

Suitably, said viscosity comprises a viscosity measured using a Brookfield DV-I Prime Viscometer.

Suitably, the ester composition has a pour point of −40° C. or less. Suitably, the ester composition has a pour point of −45° C. or less. Suitably, the ester composition has a pour point of −50° C. or less.

Suitably, the ester composition has a measured pour point of −41° C. to −59° C. or lower when said pour point is measured according to the method of ISO 3016.

Suitably, the ester composition has a COC Fire point of 300° C. or higher. Suitably, the ester composition has a COC Fire point of 310° C. or higher. Suitably, the ester composition has a COC Fire point of 315° C. or higher, for example 320° C. or higher. Suitably, said COC Fire point is measured according to the method of ISO 2592.

The ester composition may comprise any feature as described in relation to the third aspect.

According to a second aspect of the present invention there is provided a dielectric fluid composition comprising:

(I) an ester composition, wherein the ester composition comprises esters of:

(a) one or more alcohols; and (b) three or more $C_4$ to $C_{12}$ carboxylic acids wherein at least one of said acids is selected from the group consisting of:

(i) a branched $C_8$ to $C_{12}$ acid wherein said acid comprises a backbone having no branching at the C2 position;

(ii) a branched $C_4$ to $C_7$ acid; and (iii) a branched $C_9$ to $C_{12}$ acid wherein said acid comprises a backbone having branching at the C3 position; and (II) one or more additives.

Suitably, there is provided a dielectric fluid composition comprising:

(I) an ester composition, wherein the ester composition comprises esters of: (a) one or more alcohols; and (b) three or more $C_4$ to $C_{12}$ carboxylic acids wherein at least one of said acids is selected from the group consisting of:

(i) a branched $C_8$ to $C_{12}$ acid wherein said acid has the formula R1-$CH_2$—COOH wherein R1 represents a branched $C_6$ to $C_{10}$ alkyl radical;

(ii) a branched $C_4$ to $C_7$ acid wherein said acid has the formula R2-COOH wherein R2 represents a $C_3$ to $C_6$ alkyl radical; and (iii) a branched $C_9$ to $C_{12}$ acid wherein said acid has the formula R3-C(R4)(R5)-COOH wherein R3 represents an alkyl radical, R4 represents and alkyl radical and R5 represents an alkyl radical or hydrogen; and (II) one or more additives.

Suitably, said additives (II) are selected from the group consisting of antioxidants, metal deactivators and pour point depressants.

Suitably, the, or each, alcohol (a) is a polyol. The alcohol (a) suitably consists of a polyol. The alcohol (a) suitably comprises a $C_4$ to $C_{10}$ alcohol. The alcohol (a) suitably comprises a $C_4$ to $C_{10}$ polyol. The alcohol (a) suitably comprises $C_3$, $C_4$, $C_5$, $C_6$ and/or $C_{10}$ alcohol.

Suitably, the alcohol (a) comprises a $C_4$ to $C_6$ alcohol.

Suitably, the ester composition (I) comprises an ester composition according to the first aspect. Suitably, the ester composition (I) consists of an ester composition according to the first aspect.

Suitably, the dielectric fluid composition comprises said ester composition (I) in an amount of at least 95% by weight of the dielectric fluid composition. Suitably, the dielectric fluid composition comprises said ester composition (1) in an amount of at least 96% by weight of the composition, for example in an amount of at least: 97%, 98% or 99% by weight of the composition. Suitably, the dielectric fluid composition comprises said ester composition (I) in an amount of at least 99.5% by weight of the composition.

Suitably, the dielectric fluid composition comprises said additives (II) in the following amounts:

one or more antioxidants in a total amount of 0.0001% to 1% by weight of the composition;

one or more metal deactivators in a total amount of 0.0001% to 1% by weight of the composition; and one or more pour point depressants in a total amount of 0% to 1% by weight of the composition.

Suitably, the dielectric fluid composition comprises an antioxidant in an amount of at least 0.0001% by weight of the composition. Suitably, the dielectric fluid composition comprises an antioxidant in an amount of at least 0.001% by weight of the composition.

Suitably, the dielectric fluid composition comprises an antioxidant in an amount of at least 0.01% by weight of the composition. Suitably, the dielectric fluid composition comprises an antioxidant in an amount of at least 0.1% by weight of the composition. Suitably, the dielectric fluid composition comprises an antioxidant in an amount of at least 0.25% by weight of the composition, for example in an amount of 0.25% by weight of the composition.

Suitably, the antioxidant comprises a phenolic antioxidant. Suitably, the antioxidant comprises a sterically hindered phenolic antioxidant. The antioxidant may comprise BHT and/or BHA.

Suitably, the dielectric fluid composition comprises a metal deactivator in an amount of at least 0.0001% by weight of the composition. Suitably, the dielectric fluid composition comprises a metal deactivator in an amount of at least 0.001% by weight of the composition. Suitably, the dielectric fluid composition comprises a metal deactivator in an amount of at least 0.002% by weight of the composition.

Suitably, the dielectric fluid composition comprises a metal deactivator in an amount of at least 0.005% by weight of the composition, for example in an amount of 0.005% by weight of the composition.

Suitably, the metal deactivator comprises a tolutriazole derivative. Suitably, the metal deactivator comprises Irgamet 39™ available from BASF.

Suitably, the dielectric fluid composition comprises one or more additives (II) selected from the group consisting of antioxidants and metal deactivators.

Suitably, the dielectric fluid composition is substantially free from pour point depressant. Suitably, the ester composition (I) is suitable for use as a dielectric fluid without the need to be combined with a pour point depressant.

Suitably, the dielectric fluid composition comprises an ester composition (I) and additives (II) in a combined amount of at least 95% by weight of the composition. Suitably, the dielectric fluid composition comprises an ester composition (I) and additives (II) in a combined amount of at least 99% by weight of the composition. Suitably, the dielectric fluid composition comprises an ester composition (I) and additives (II) in a combined amount of at least 99.9% by weight of the composition. Suitably, the dielectric fluid composition consists of an ester composition (I) and additives (II).

Suitably, the dielectric fluid composition comprises an ester composition, an antioxidant and a metal deactivator in a combined amount of at least 95% by weight of the composition.

Suitably, the dielectric fluid composition comprises an ester composition, an antioxidant and a metal deactivator in a combined amount of at least 99% by weight of the composition. Suitably, the dielectric fluid composition comprises an ester composition, an antioxidant and a metal deactivator in a combined amount of at least 99.9% by weight of the composition. Suitably, the dielectric fluid composition consists of an ester composition, an antioxidant and a metal deactivator.

The dielectric fluid composition may comprise alcohol and/or acids as impurities. Suitably, the dielectric fluid composition is substantially free of alcohol and/or acids.

Suitably, the dielectric fluid composition has a viscosity of 35 cP or less at 40° C. Suitably, the dielectric fluid composition has a viscosity of 30 cP or less at 40° C. Suitably, the dielectric fluid composition has a viscosity of 27 cP or less at 40° C. Suitably, said viscosity comprises dynamic viscosity. Suitably, said viscosity comprises a viscosity measured using a Brookfield DV-1 Prime Viscometer.

Suitably, the dielectric fluid composition has a pour point of −40° C. or less.

Suitably, the dielectric fluid composition has a pour point of −45° C. or less. Suitably, the dielectric fluid composition has a pour point of −50° C. or less.

Suitably the dielectric fluid composition has a measured pour point of −41° C. to −59° C. or lower when said pour point is measured according to the method of ISO 3016.

Suitably, the dielectric fluid composition has a COC Fire point of 300° C. or higher.

Suitably, the dielectric fluid composition has a COC Fire point of 310° C. or higher. Suitably, the dielectric fluid composition has a COC Fire point of 315° C. or higher, for example 320° C. or higher.

The dielectric fluid composition may comprise an ester composition having any feature as described in relation to the first aspect and/or third aspect. Suitably, the dielectric fluid composition comprises an ester composition according to the first aspect.

The dielectric fluid composition may comprise an ester manufactured according to the method of the third aspect. The dielectric fluid composition may comprise any feature as described in relation to the fourth aspect According to a third aspect of the present invention there is provided a method of manufacturing an ester composition, wherein the method comprises forming esters by reacting:

(a) one or more alcohols; and
(b) three or more $C_4$ to $C_{12}$ carboxylic acids wherein at least one of said acids is selected from the group consisting of:
(i) a branched $C_8$ to $C_{12}$ acid wherein said acid comprises a backbone having no branching at the C2 position;
(ii) a branched $C_4$ to $C_7$ acid; and
(iii) a branched $C_9$ to $C_{12}$ acid wherein said acid comprises a backbone having branching at the C3 position.

Suitably, the method comprises a method of manufacturing an ester according to the first aspect. The ester composition may comprise any feature as described in relation to the first aspect.

Suitably, there is provided a method of manufacturing an ester composition, wherein the method comprises forming esters by reacting:

(a) one or more alcohols; and
(b) three or more $C_4$ to $C_{12}$ carboxylic acids wherein at least one of said acids is selected from the group consisting of:
(i) a branched $C_8$ to $C_{12}$ acid wherein said acid has the formula $R1\text{-}CH_2\text{—}COOH$ wherein R1 represents a branched $C_6$ to $C_{10}$ alkyl radical;
(ii) a branched $C_4$ to $C_7$ acid wherein said acid has the formula R2-COOH wherein R2 represents a $C_3$ to $C_6$ alkyl radical; and
(iii) a branched $C_9$ to $C_{12}$ acid wherein said acid has the formula R3-C(R4)(R5)-COOH wherein R3 represents an alkyl radical, R4 represents and alkyl radical and R5 represents an alkyl radical or hydrogen.

Suitably, the method comprises forming esters by reacting an alcohol with three or more saturated fatty acids.

Suitably, the method comprises forming esters by reacting one or more alcohols and three or more $C_4$ to $C_{12}$ carboxylic acids. Suitably, the method comprises forming esters by reacting one or more alcohols and three or more $C_4$ to $C_{12}$ carboxylic acids. Suitably, the method comprises forming esters by reacting one or more alcohols and four or more $C_4$ to $C_{12}$ carboxylic acids. Suitably, the method comprises forming esters by reacting one or more alcohols and four $C_4$ to $C_{12}$ carboxylic acids.

Suitably, the method comprises forming esters by reacting an alcohol with a $C_4$-$C_{12}$ acid having no branching at the $C_2$ position. Suitably, the method comprises forming esters by reacting an alcohol with a $C_4$, $C_5$, $C_6$, $C_7$, $C_8$, $C_9$, $C_{10}$, $C_{11}$, or $C_{12}$ acid having no branching at the C2 position.

Suitably, the method comprises forming esters by reacting one or more linear chain $C_4$ to $C_{12}$ carboxylic acids and one or more branched chain $C_4$ to $C_{12}$ carboxylic acids with one or more alcohols.

Suitably, the method comprises forming esters by reacting:

(a) one or more alcohols; and
(b) three or more $C_4$ to $C_{12}$ carboxylic acids wherein at least one of said acids is a linear chain acid and wherein at least one of said acids is a branched chain acid selected from the group consisting of:
(i) a branched $C_8$ to $C_{12}$ acid wherein said acid comprises a backbone having no branching at
the C2 position; and
(ii) a branched $C_4$ to $C_7$ acid.

Suitably, the method comprises forming esters by reacting carboxylic acids with one alcohol.

Suitably, the method comprises forming esters by reacting an alcohol having two or more hydroxyl groups with carboxylic acids. Suitably, the method comprises forming esters by reacting an alcohol having three or more hydroxyl groups with carboxylic acids. Suitably, the method comprises forming esters by reacting an alcohol having four or more hydroxyl groups with carboxylic acids.

Suitably, the or each alcohol (a) is a polyol. The alcohol (a) suitably consists of a polyol. The alcohol (a) suitably comprises a $C_4$ to $C_{10}$ alcohol. The alcohol (a) suitably comprises a $C_4$ to $C_{10}$ polyol. The alcohol (a) suitably comprises $C_3$, $C_4$, $C_5$, $C_6$ and/or $C_{10}$ alcohol.

Suitably, the alcohol (a) comprises a $C_4$ to $C_6$ alcohol.

Suitably, there is provided a method of manufacturing an ester composition, wherein the method comprises forming esters by reacting:

(a) one or more polyols; and
(b) three or more $C_4$ to $C_{12}$ carboxylic acids wherein at least one of said acids is selected from the group consisting of:
(i) a branched $C_8$ to $C_{12}$ acid wherein said acid comprises a backbone having no branching at the C2 position; and
(ii) a branched $C_4$ to $C_7$ acid.

Suitably, the alcohol (a) comprises a $C_5$ alcohol. Suitably, the alcohol (a) consists of a $C_5$ alcohol.

Suitably, the alcohol (a) comprises pentaerythritol.

Suitably, the alcohol (a) consists of pentaerythritol.

Suitably, the method comprises forming esters by reacting one alcohol and three or more $C_4$ to $C_{12}$ carboxylic acids. Suitably, the method comprises forming esters by reacting one alcohol and three or more $C_4$ to $C_{12}$ carboxylic acids. Suitably, the method comprises forming esters by reacting one alcohol and four or more $C_4$ to $C_{12}$ carboxylic acids. Suitably, the method comprises forming esters by reacting one alcohol and four $C_4$ to $C_{12}$ carboxylic acids.

Suitably, the method comprises forming esters by reacting:

(a) an alcohol; and
(b) four or more $C_4$ to $C_{12}$ carboxylic acids wherein at least one of said acids is selected from the group consisting of:

(i) a branched $C_8$ to $C_{12}$ acid wherein said acid comprises a backbone having no branching at the C2 position; and (ii) a branched $C_4$ to $C_7$ acid.

Suitably, the method comprises forming esters by reacting: (a) an alcohol; and (b) four $C_4$ to $C_{12}$ carboxylic acids wherein at least one of said acids is selected from the group consisting of:

(i) a branched $C_8$ to $C_{12}$ acid wherein said acid comprises a backbone having no branching at the C2 position; and (ii) a branched $C_4$ to $C_7$ acid.

Suitably, the method comprises forming esters by reacting one or more linear chain $C_4$ to $C_{12}$ carboxylic acids and one or more branched chain $C_4$ to $C_{12}$ carboxylic acids with one alcohol. Suitably, the method comprises forming esters by reacting three or more linear chain $C_4$ to $C_{12}$ carboxylic acids and one branched chain $C_4$ to $C_{12}$ carboxylic acid with one alcohol.

Suitably, the method comprises forming esters by reacting three linear chain $C_4$ to $C_{12}$ carboxylic acids and one branched chain $C_4$ to $C_{12}$ carboxylic acid with one alcohol.

Suitably, the method comprises forming esters by reacting: (a) an alcohol; and (b) four $C_4$ to $C_{12}$ carboxylic acids wherein at least one of said acids is a linear chain acid and wherein at least one of said acids is a branched chain acid selected from the group consisting of:

(i) a branched $C_8$ to $C_{12}$ acid wherein said acid comprises a backbone having no branching at the C2 position; and (ii) a branched $C_4$ to $C_7$ acid.

Suitably, the method comprises forming esters by reacting pentaerythritol with carboxylic acids. Suitably, the method comprises forming esters by reacting pentaerythritol with a mixture of carboxylic acids.

Suitably, the method comprises forming esters by reacting: (a) pentaerythritol; and (b) four $C_4$ to $C_{12}$ carboxylic acids wherein at least one of said acids is a linear chain acid and wherein at least one of said acids is a branched chain acid selected from the group consisting of:

(i) a branched $C_8$ to $C_{12}$ acid wherein said acid comprises a backbone having no branching at the C2 position; and (ii) a branched $C_4$ to $C_7$ acid.

Suitably, the method comprises forming esters by reacting: (a) pentaerythritol; and (b) four $C_4$ to $C_{12}$ carboxylic acids wherein one of said acids is selected from the group consisting of:

(i) a branched $C_8$ to $C_{12}$ acid wherein said acid comprises a backbone having no branching at the C2 position; and wherein the remainder of said acids are linear chain acids.

Suitably, the method comprises forming esters by reacting:

(a) pentaerythritol; and (b) an acid mixture comprising four $C_4$ to $C_{12}$ carboxylic acids wherein one of said acids is selected from the group consisting of:

(i) a branched $C_8$ to $C_{12}$ acid wherein said acid comprises a backbone having no branching at the C2 position; and wherein the remainder of said acids are linear chain acids.

Suitably, one of said acids (b) is heptanoic acid. Suitably, one of said acids (b) is n-octanoic acid. Suitably, one of said acids (b) is 3,5,5-trimethylhexanoic acid. Suitably, one of said acids (b) is n-decanoic acid.

Suitably, the method comprises forming esters by reacting: (a) pentaerythritol; and (b) heptanoic acid, n-octanoic acid, 3,5,5-trimethylhexanoic acid and n-decanoic acid.

Suitably, the method comprises forming esters by reacting: (a) pentaerythritol; and (b) an acid mixture comprising heptanoic acid, n-octanoic acid, 3,5,5-trimethylhexanoic acid and n-decanoic acid.

Suitably, the method comprises forming esters by reacting a mixture of alcohol and carboxylic acids in which:

(a) pentaerythritol is the sole alcohol; and (b) heptanoic acid, n-octanoic acid, 3,5,5-trimethylhexanoic acid and n-decanoic acid are the sole carboxylic acids.

Suitably, the method comprises forming esters by reacting an alcohol with an acid mixture, wherein said acid mixture comprises at least 50% of a $C_7$ acid, suitably heptanoic acid, as a molar percentage of the acid mixture, for example at least 55%.

Suitably, the method comprises forming esters by reacting an alcohol with an acid mixture, wherein said acid mixture comprises 50-70% of a $C_7$ acid as a molar percentage of the acid mixture.

Suitably, the method comprises forming esters by reacting an alcohol with an acid mixture, wherein said acid mixture comprises at least 5% of a $C_8$ acid, suitably n-octanoic acid as a molar percentage of the acid mixture.

Suitably, the method comprises forming esters by reacting an alcohol with an acid mixture, wherein said acid mixture comprises at least 5% of a $C_{10}$ acid, suitably n-decanoic acid, as a molar percentage of the acid mixture.

Suitably, the method comprises forming esters by reacting an alcohol with an acid mixture, wherein said acid mixture comprises 10-30% of a combination of $C_8$ and $C_{10}$ acids as a molar percentage of the acid mixture.

Suitably, the method comprises forming esters by reacting an alcohol with an acid mixture, wherein said acid mixture comprises at least 10% of a $C_9$ acid, suitably 3,5,5-trimethyl hexanoic acid, as a molar percentage of the acid mixture, for example at least 15%.

Suitably, the method comprises forming esters by reacting an alcohol with an acid mixture, wherein said acid mixture comprises 10-30% of a $C_9$ acid as a molar percentage of the acid mixture.

Suitably, the method comprises forming esters by reacting pentaerythritol with an acid mixture, wherein said acid mixture comprises one or more of:

40-70 molar % $C_7$ acid;

10-35 molar % of a mixture of $C_8$ and $C_{10}$ acids; and 10-30 molar % $C_9$ acid.

Suitably, the method comprises forming esters by reacting pentaerythritol with an acid mixture, wherein said acid mixture comprises acids in the following molar percentages:

50-70% $C_7$ acid;

10-30% of a mixture of $C_8$ and $C_{10}$ acids; and 10-30% $C_9$ acid.

Suitably, the method comprises forming esters by reacting pentaerythritol with an acid mixture, wherein said acid mixture comprises one or more of:

40-70 molar % linear $C_7$ acid;

10-35 molar % of a mixture of linear $C_8$ and linear $C_{10}$ acids; and 10-30 molar % branched $C_9$ acid.

Suitably, the method comprises forming esters by reacting pentaerythritol with an acid mixture, wherein said acid mixture comprises acids in the following molar percentages:

50-70% linear $C_7$ acid;

10-30% of a mixture of linear $C_8$ and linear $C_{10}$ acids; and 10-30% branched $C_9$ acid.

Suitably, the method comprises forming esters by reacting pentaerythritol with an acid mixture, wherein said acid mixture comprises acids in the following molar percentages:

55-70% linear $C_7$ acid;

10-25% of a mixture of linear $C_8$ and linear $C_{10}$ acids; and 15-25% branched $C_9$ acid.

Suitably, according to the present invention there is provided a method of manufacturing esters by reacting pentaerythritol with an acid mixture, wherein said acid mixture comprises one or more of:

40-70 molar % heptanoic acid;

10-35 molar of a mixture of % n-octanoic and n-decanoic acids; and 10-35 molar % 3,5,5-trimethylhexanoic acid.

Suitably, according to the present invention there is provided a method of manufacturing esters by reacting pentaerythritol with an acid mixture, wherein said acid mixture comprises acids in the following molar percentages:

40-70% heptanoic acid;

10-35% of a mixture of n-octanoic and n-decanoic acids; and 10-30% 3,5,5-trimethylhexanoic acid.

Suitably, according to the present invention there is provided a method of manufacturing esters by reacting pentaerythritol with an acid mixture, wherein said acid mixture comprises acids in the following molar percentages:

50-70% heptanoic acid;

10-30% of a mixture of n-octanoic and n-decanoic acids; and 10-30% 3,5,5-trimethylhexanoic acid.

Suitably, said acid mixture comprises said acids in the following molar percentages of said acid mixture:

60-70% heptanoic acid;

12-20% of a mixture of n-octanoic and n-decanoic acids; and 15-25% 3,5,5-trimethylhexanoic acid.

Suitably, said acid mixture comprises said acids in the following molar percentages of said acid mixture:

62-68% heptanoic acid;

13-18% of a mixture of n-octanoic and n-decanoic acids; and 17-23% 3,5,5-trimethylhexanoic acid.

Suitably, the method comprises forming esters by reacting pentaerythritol with an acid mixture, wherein said acid mixture comprises acids in the following molar percentages:

65% heptanoic acid;

15% of a mixture of n-octanoic and n-decanoic acids; and

20% 3,5,5-trimethylhexanoic acid.

Suitably, the method comprises forming tetraesters. Suitably, the method comprises forming pentaerythritol tetraesters.

Suitably, the method comprises reacting an alcohol with an excess of carboxylic acids. Suitably, the method comprises reacting an alcohol with carboxylic acids wherein said acids are in excess by an amount of at least 10 molar %. Suitably, the method comprises reacting an alcohol with carboxylic acids wherein said acids are in excess by an amount of at least 20 molar, for example an excess of 30 molar %.

Suitably, the method comprises refluxing an alcohol and carboxylic acid mixture. Suitably, the method comprises refluxing an alcohol and carboxylic acid mixture for between 2 and 3 hours.

Suitably, the method comprises refluxing an alcohol and carboxylic acid mixture at a temperature of between 245° C. and 255° C., for example between 248° C. and 252° C. Suitably, the method comprises refluxing under a nitrogen atmosphere.

Suitably, the method comprises removing water as it is formed. Suitably, the method comprises removing excess acid following the reflux stage. Suitably, the method comprises neutralising the reaction mixture following the reflux stage. Suitably, the method comprises treating the ester composition. Suitably, the method comprises adding alumina. Suitably, the method comprises adding Fuller's earth powders. Suitably, the method comprises filtering the ester composition. Suitably, the method comprises adding an antioxidant. The method may comprise adding an antioxidant with heating, suitably prior to filtering.

According to a fourth aspect of the present invention there is provided a method of manufacturing a dielectric fluid composition comprising an ester composition, wherein the method comprises combining an ester composition (I) with an additive (II) wherein said ester composition (I) comprises an ester of:

(a) one or more alcohols; and (b) three or more $C_4$ to $C_{12}$ carboxylic acids wherein at least one of said acids is selected from the group consisting of:

(i) a branched $C_8$ to $C_{12}$ acid wherein said acid comprises a backbone having no branching at the C2 position;

(ii) a branched $C_4$ to $C_7$ acid; and (iii) a branched $C_9$ to $C_{12}$ acid wherein said acid comprises a backbone having branching at the C3 position.

Suitably, the or each alcohol (a) is a polyol. The alcohol (a) suitably consists of a polyol. The alcohol (a) suitably comprises a $C_4$ to $C_{10}$ alcohol. The alcohol (a) suitably comprises a $C_4$ to $C_{10}$ polyol. The alcohol (a) suitably comprises $C_3$, $C_4$, $C_5$, $C_6$ and/or $C_{10}$ alcohol. Suitably, the alcohol (a) comprises a $C_4$ to $C_6$ alcohol.

Suitably, the ester composition (I) comprises an ester according to the first aspect.

Suitably, the method comprises a method of manufacturing a dielectric fluid according to the second aspect.

Suitably, the method comprises manufacturing an ester (I) according to the method of the third aspect and combining an additive (II) therewith.

Suitably, the additive (II) is selected from the group consisting of antioxidants, metal deactivators and pour point depressants.

Suitably, the method comprises adding an antioxidant. The method may comprise adding an antioxidant with heating. The method may comprise adding an antioxidant prior to filtering of the ester composition.

Suitably the method comprises adding a metal deactivator. The method may comprise adding a metal deactivator subsequent to filtering of the ester composition.

The method may comprise any feature as described in relation to the first, second and/or third aspects.

According to a fifth aspect of the present invention there is provided an electrical apparatus comprising an ester composition according to the first aspect and/or a dielectric fluid according to the second aspect and/or an ester composition manufactured according to the method of the third aspect and/or a dielectric fluid composition manufactured according to the method of the fourth aspect.

Suitably, the electrical apparatus comprises a transformer. Suitably, the electrical apparatus comprises a high voltage transformer.

According to a sixth aspect of the present invention there is provided the use of an ester composition according to the first aspect and/or an ester composition manufactured according to the method of the second aspect as a dielectric fluid.

DETAILED DESCRIPTION OF PREFERRED EMBODIMENTS

The present invention will now be illustrated by way of example.

Example 1

An ester composition suitable for use as a dielectric fluid was prepared by forming esters by reacting pentaerythritol with a mixture of heptanoic acid ($C_7$), 3,5,5-trimethylhexanoic acid (isononanoic acid) ($iC_9$) and a mixture of octanoic acid and decanoic acid ($C_8/C_{10}$).

The mixture of octanoic acid and decanoic acid ($C_8/C_{10}$) used in the method comprised a commercially available mixed acid described as having the composition as set out in Table 1.

TABLE 1

| Component | Proportion (% w/w) |
|---|---|
| $C_6$ | <3 |
| $C_8$ | 50-65 |
| $C_{10}$ | 35-50 |
| $C_{12}$ | <3 |
| Other | <1 |

Approximately 900 g of ester composition was prepared according to the following method:

200 g pentaerythritol was combined with 650 g heptanoic acid ($C_7$), 243 g 3,5,5-trimethylhexanoic acid (isononanoic acid) ($iC_9$) and 179 g of a mixture of n-octanoic acid and n-decanoic acid ($C_8/C_{10}$). The amounts of acids and alcohol were selected such that the acid mixture was present in 30 molar % excess relative to the alcohol and such that the acids were present relative to one another in the molar percentages set out in Table 2.

TABLE 2

| Acid | Molar % |
|---|---|
| $C_7$ | 65 |
| $iC_9$ | 20 |
| $C_8/C_{10}$ mixture | 15 |

Esters were then prepared by refluxing pentaerythritol and the acid mixture at between 248-252° C. under a nitrogen atmosphere for 2.5 hours to produce an ester composition. Water was removed as it was formed using Dean-Stark apparatus.

Following completion of the reflux stage excess acid was removed by vacuum distillation, and the acid value, hydroxyl value and colour of the ester composition was determined. The results are presented in Table 4.

The ester composition was then processed further to prepare a dielectric fluid composition.

The ester composition was then stirred at 80° C. for one hour in the presence of Alumina in an amount of 1 g Alumina for every 0.01 mg KOH/g required to neutralise the reaction mixture to remove any residual acid. As well as Fullers' earth powders F160 (0.45% w/w) and F115FF (0.112% w/w) to clean the sample, and sterically hindered phenolic antioxidant (0.25% w/w).

The composition was then filtered.

A tolutriazole derivative metal deactivator, Irgamet 39, was added to the composition in an amount of 0.005% w/w.

The composition was then degassed for approximately thirty minutes until the moisture content of the composition was below 80 ppm.

Electrical and physical testing was performed on the composition according to the test methods given in Table 3. The results are presented in Table 4.

TABLE 3

| Property | Test Method |
|---|---|
| Water content | IEC 60814 |
| Acid Value | Modified IEC 62021-2 |
| Hydroxyl value | IR spectrometer |
| Colour | ISO 2211 |
| Tan delta at 90° C. | IEC 60247 |
| VR at 90° C. | IEC 60247 |
| Breakdown voltage | IEC 60156 |
| Viscosity at 40° C. | Brookfield DV-I Prime Viscometer |
| Density at 20° C. | ISO 3675 |
| COC flash point | ISO 2592 |
| COC fire point | ISO 2592 |
| PMCC flash point | ISO 2719 |
| Pour point | Modified ISO 3016 |

TABLE 4

| Physical and electrical properties | Value |
|---|---|
| Water content (ppm) | 28 |
| Acid Value (mgKOH/g) | 0.013 |
| Hydroxyl (mgKOH/g) | 0.8 |
| Colour (HU) | 65 |
| Tan delta at 90° C. | 0.008 |
| VR at 90° C. (GΩm) | 32 |
| Breakdown (kV) | 79.4 |
| Viscosity at 40° C. (cP) | 26.9 |
| Density at 20° C. (g/cm$^3$) | 0.969 |
| COC flash point (° C.) | 290 |
| COC Fire point (° C.) | 322 |
| PMCC Flash point (° C.) | 266 |
| Pour point (° C.) | −55 |

As can be seen from the above the dielectric fluid composition of Example 1 has physical and electrical properties rendering it suitable for use as a dielectric fluid.

Examples 2 to 5

The method of Example 1 was repeated using different ratios of acids. Esters were thus formed by reacting pentaerythritol with a mixture of heptanoic acid ($C_7$), 3,5,5-trimethyl hexanoic acid (isononanoic acid) ($iC_9$) and a mixture of octanoic acid and decanoic acid ($C_8/C_{10}$). Again, the mixture of octanoic acid and decanoic acid ($C_8/C_{10}$) used in the method had the composition as set out in Table 1.

In each example approximately 900 g of ester composition was prepared according to the following method:

Pentaerythritol was combined with heptanoic acid ($C_7$), 3,5,5-trimethyl hexanoic acid (isononanoic acid) ($iC_9$) and a mixture of octanoic acid and decanoic acid ($C_8/C_{10}$). The amounts of acids and alcohol were selected such that the acid mixture was present in 30 molar % excess relative to the alcohol and such that the acids were present relative to one another in the molar percentages set out in Table 5

TABLE 5

| Example | 1 | 2 | 3 | 4 | 5 |
|---|---|---|---|---|---|
| Acid Molar % | | | | | |
| $C_7$ | 65 | 70 | 60 | 55 | 60 |
| $iC_9$ | 20 | 20 | 20 | 20 | 25 |
| $C_8/C_{10}$ | 15 | 10 | 20 | 25 | 15 |

In each example esters were then prepared by refluxing pentaerythritol and the acid mixture at between 248-252° C. under a nitrogen atmosphere for between 2 and 3 hours to produce an ester composition. Water was removed as it was formed using Dean-Stark apparatus.

Following completion of the reflux stage the ester composition was processed and tested as described in relation to Example 1. The results are presented in Table 6 together with the results of Example 1.

TABLE 6

| Example | 1 | 2 | 3 | 4 | 5 |
|---|---|---|---|---|---|
| Acid Ratio | | | | | |
| $C_7$ | 65 | 70 | 60 | 55 | 60 |
| $iC_9$ | 20 | 20 | 20 | 20 | 25 |
| $C_8/C_{10}$ | 15 | 10 | 20 | 25 | 15 |
| Physical and electrical properties | | | | | |
| Water content (ppm) | 28 | 42 | 69 | 68 | 55 |
| Acid Value (mgKOH/g) | 0.013 | 0.015 | 0.02 | 0.013 | 0.024 |
| Hydroxyl (mgKOH/g) | 0.8 | 0.2 | <0.5 | 1.7 | 2.8 |
| Colour (HU) | 65 | 58 | 49 | 68 | 92 |
| Tan delta at 90° C. | 0.008 | | 0.0084 | 0.0076 | 0.0178 |
| VR at 90° C. (GΩm) | 32 | | 32 | 36.4 | 15.2 |
| Breakdown (kV) | 79.4 | | 65 | 71 | 79 |
| Viscosity at 40° C. (cP) | 26.9 | 26 | 26.9 | 27.8 | 27.4 |
| Density at 20° C. (g/cm$^3$) | 0.969 | 0.967 | 0.967 | 0.969 | 0.968 |
| COC flash point (° C.) | 290 | 274 | 278 | 270 | 282 |
| COC Fire point (° C.) | 322 | 320 | 320 | 328 | 320 |
| PMCC Flash point (° C.) | 266 | 266 | 261 | 268 | 264 |
| Pour point (°C) | −55 | −52.5 | −54 | −50 | −54 |

It will be appreciated that preferred embodiments of ester compositions according to the present invention may have physical and electrical properties making them suitable for use in dielectric fluid compositions in electrical apparatus such as for example transformers.

It will be appreciated that preferred embodiments of dielectric fluid compositions according to the present invention may have a viscosity at 40° C. which compares favourably to known dielectric fluid compositions.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An ester composition, wherein the ester composition comprises esters formed from the reaction of:

(a) pentaerythritol; and (b) three or more $C_4$ to $C_{12}$ monocarboxylic acids, wherein only one of the three or more $C_4$ to $C_{12}$ monocarboxylic acids is a branched carboxylic acid and the remaining acids are each independently linear chain carboxylic acids, wherein the branched carboxylic acid is selected from the group consisting of:

(i) a branched $C_8$ to $C_{12}$ carboxylic acid wherein the branched $C_8$ to $C_{12}$ carboxylic acid comprises a backbone having no branching at the C2 position; and (ii) a branched $C_9$ to $C_{12}$ carboxylic acid wherein the branched $C_9$ to $C_{12}$ carboxylic acid comprises a backbone having branching at the C3 position;

wherein the three or more $C_4$ to $C_{12}$ monocarboxylic acids comprise at least 50% of heptanoic acid, as a molar percentage of total acid content.

2. The ester composition of claim 1, wherein the linear chain carboxylic acids comprise a linear $C_{10}$ carboxylic acid.

3. The ester composition of claim 1, wherein the ester composition comprises esters formed from the reaction of:

(a) pentaerythritol; and (b) four $C_7$ to $C_{10}$ monocarboxylic acids wherein at least one of the four $C_7$ to $C_{10}$ monocarboxylic acids is a branched $C_8$ to $C_{10}$ carboxylic acid wherein the branched $C_8$ to $C_{10}$ carboxylic acid comprises a backbone having no branching at the C2 position.

4. The ester composition of claim 1, wherein the ester composition comprises esters formed from the reaction of:

(a) pentaerythritol; and (b) heptanoic acid, n-octanoic acid, 3,5,5-trimethylhexanoic acid and n-decanoic acid; and wherein the ester composition is prepared by reacting pentaerythritol with an acid mixture, wherein the acid mixture comprises heptanoic acid, n-octanoic acid, 3,5,5-trimethylhexanoic acid and n-decanoic acid in the following molar percentages of the acid mixture:

60-70% heptanoic acid;

12-20% of a mixture of n-octanoic and n-decanoic acids; and 15-25% 3,5,5-trimethylhexanoic acid.

5. A dielectric fluid composition comprising:

(I) an ester composition, wherein the ester composition comprises esters of:

(a) pentaerythritol; and (b) three or more $C_4$ to $C_{12}$ monocarboxylic acids, wherein only one of the three or more $C_4$ to $C_{12}$ monocarboxylic acids is a branched carboxylic acid and the remaining acids are each independently linear chain carboxylic acids, wherein the branched carboxylic acid is selected from the group consisting of:

(i) a branched $C_8$ to $C_{12}$ carboxylic acid wherein the branched $C_8$ to $C_{12}$ carboxylic acid comprises a backbone having no branching at the C2 position; and (ii) a branched $C_9$ to $C_{12}$ carboxylic acid wherein the branched $C_9$ to $C_{12}$ carboxylic acid comprises a backbone having branching at the C3 position;

wherein the three or more $C_4$ to $C_{12}$ monocarboxylic acids comprise at least 50% of heptanoic acid, as a molar percentage of total acid content; and (II) one or more additives.

6. The dielectric fluid composition of claim 5, wherein the one or more additives (II) are selected from the group consisting of antioxidants, metal deactivators and pour point depressants.

7. The dielectric fluid composition of claim 5, wherein the dielectric fluid composition comprises an antioxidant in an amount of at least 0.0001% by weight of the composition and/or a metal deactivator in an amount of at least 0.0001% by weight of the composition; wherein the antioxidant optionally comprises a sterically hindered phenolic antioxidant and/or wherein the metal deactivator comprises a tolutriazole derivative.

8. The dielectric fluid composition of claim 5, wherein the ester composition (I) comprises esters of:

(a) pentaerythritol; and (b) heptanoic acid, n-octanoic acid, 3,5,5-trimethylhexanoic acid and n-decanoic acid; and wherein the ester composition is prepared by reacting pentaerythritol with an acid mixture, wherein the acid mixture comprises heptanoic acid, n-octanoic acid, 3,5,5-trimethylhexanoic acid and n-decanoic acid in the following molar percentages of the acid mixture:

60-70% heptanoic acid;

12-20% of a mixture of n-octanoic and n-decanoic acids; and 15-25% 3,5,5-trimethylhexanoic acid.

9. A method of manufacturing an ester composition, wherein the method comprises forming esters by reacting:

(a) pentaerythritol; and (b) three or more $C_4$ to $C_{12}$ monocarboxylic acids, wherein only one of the three or more $C_4$ to $C_{12}$ monocarboxylic acids is a branched carboxylic acid and the remaining acids are each independently linear chain carboxylic acids, wherein the branched carboxylic acid is selected from the group consisting of:

(i) a branched $C_8$ to $C_{12}$ carboxylic acid wherein the branched $C_8$ to $C_{12}$ carboxylic acid comprises a backbone having no branching at the C2 position; and (ii) a branched $C_9$ to $C_{12}$ carboxylic acid wherein the branched $C_9$ to $C_{12}$ carboxylic acid comprises a backbone having branching at the C3 position;

wherein the three or more $C_4$ to $C_{12}$ monocarboxylic acids comprise at least 50% of heptanoic acid, as a molar percentage of total acid content.

10. The method of claim 9, wherein the method comprises forming esters by reacting pentaerythritol with an acid mixture, wherein the acid mixture comprises:

50-70% of heptanoic acid as a molar percentage of the acid mixture; and 10-30% of a combination of $C_8$ and $C_{10}$ monocarboxylic acids as a molar percentage of the acid mixture and/or 10-30% of a $C_9$ monocarboxylic acid as a molar percentage of the acid mixture.

11. The method of claim 9, wherein the method comprises forming esters by reacting:

(a) pentaerythritol; and (b) four $C_7$ to $C_{10}$ monocarboxylic acids wherein one of the four $C_7$ to $C_{10}$ monocarboxylic acids is a branched $C_8$ to $C_{10}$ carboxylic acid wherein the branched $C_8$ to $C_{10}$ carboxylic acid comprises a backbone having no branching at the C2 position and the remaining carboxylic acids are each independently linear chain carboxylic acids.

12. The method of claim 11, wherein the method comprises forming esters by reacting pentaerythritol with an acid mixture, wherein the acid mixture comprises heptanoic acid, n-octanoic acid, 3,5,5-trimethylhexanoic acid and n-decanoic acid in the following molar percentages of the acid mixture:

60-70% heptanoic acid;

12-20% of a mixture of n-octanoic and n-decanoic acids; and 15-25% 3,5,5-trimethylhexanoic acid.

13. A method of manufacturing a dielectric fluid composition comprising an ester composition, wherein the method comprises combining ester composition (I) with one or more additives (II) wherein ester composition (I) comprises an ester of:

(a) pentaerythritol; and (b) three or more $C_4$ to $C_{12}$ monocarboxylic acids, wherein only one of the three or more $C_4$ to $C_{12}$ monocarboxylic acids is a branched carboxylic acid and the remaining acids are each independently linear chain carboxylic acids, wherein the branched carboxylic acid is selected from the group consisting of:

(i) a branched $C_8$ to $C_{12}$ carboxylic acid wherein the branched $C_8$ to $C_{12}$ carboxylic acid comprises a backbone having no branching at the C2 position; and (ii) a branched $C_9$ to $C_{12}$ carboxylic acid wherein the branched $C_9$ to $C_{12}$ carboxylic acid comprises a backbone having branching at the C3 position;

wherein the three or more $C_4$ to $C_{12}$ monocarboxylic acids comprise at least 50% of heptanoic acid, as a molar percentage of total acid content.

14. An electrical apparatus comprising the ester composition of claim 1.

15. The electrical apparatus of claim 14, wherein the electrical apparatus is a transformer.

16. A method of using the ester composition of claim 1, comprising preparing a dielectric fluid comprising the ester composition of claim 1 and one or more additives, and introducing the dielectric fluid into an electrical apparatus.

17. The method of claim 16, wherein the electrical apparatus is a transformer.

* * * * *